(12) United States Patent
Boujida et al.

(10) Patent No.: US 10,883,422 B2
(45) Date of Patent: Jan. 5, 2021

(54) COOLING DEVICE FOR A TURBOMACHINE SUPPLIED BY A DISCHARGE CIRCUIT

(71) Applicant: SAFRAN AIRCRAFT ENGINES, Paris (FR)

(72) Inventors: Benissa Boujida, Moissy-Cramayel (FR); Daniel Bernava, Moissy-Cramayel (FR); Dominik Igel, Moissy-Cramayel (FR); Maxime Aurélien Rotenberg, Moissy-Cramayel (FR)

(73) Assignee: SNECMA, Paris (FR)

( * ) Notice: Subject to any disclaimer, the term of this patent is extended or adjusted under 35 U.S.C. 154(b) by 512 days.

(21) Appl. No.: 15/528,474

(22) PCT Filed: Nov. 24, 2015

(86) PCT No.: PCT/FR2015/053200
§ 371 (c)(1),
(2) Date: May 19, 2017

(87) PCT Pub. No.: WO2016/083732
PCT Pub. Date: Jun. 2, 2016

(65) Prior Publication Data
US 2017/0335769 A1    Nov. 23, 2017

(30) Foreign Application Priority Data
Nov. 25, 2014 (FR) ...................... 14 61416

(51) Int. Cl.
*F02C 7/14* (2006.01)
*F02C 6/08* (2006.01)

(52) U.S. Cl.
CPC .................. *F02C 7/14* (2013.01); *F02C 6/08* (2013.01); *F05D 2260/213* (2013.01);
(Continued)

(58) Field of Classification Search
CPC ........ F02C 7/14; F02C 6/08; F05D 2260/213; F05D 2260/601; F05D 2270/101; Y02T 50/671; Y02T 50/675
See application file for complete search history.

(56) References Cited

U.S. PATENT DOCUMENTS

| 8,261,527 | B1 | 9/2012 | Stearns et al. |
| 8,966,875 | B2 * | 3/2015 | Suciu .................. F02C 7/32 184/6.11 |
| 10,196,936 | B2 * | 2/2019 | Stearns ................ F01D 25/12 |

FOREIGN PATENT DOCUMENTS

| EP | 0 511 770 A1 | 11/1992 |
| EP | 1 018 468 A1 | 7/2000 |

OTHER PUBLICATIONS

International Preliminary Report on Patentability dated May 30, 2017, issued in corresponding International Application No. PCT/FR2015/053200, filed Nov. 24, 2015, 1 page.
(Continued)

*Primary Examiner* — Eldon T Brockman
(74) *Attorney, Agent, or Firm* — Christensen O'Connor Johnson Kindness PLLC (57) ABSTRACT

The invention relates to a turbine engine, comprising:
a device for bleeding a compressor, particularly a high-pressure compressor, comprising at least one valve for bleeding said compressor, an outlet of said valve being connected to a bleed system designed to discharge a bleed airflow; and
at least one device for cooling at least one unit, comprising a heat exchanger, an air outlet of which is connected to an ejector of the jet pump type, which comprises a feed-through duct for a secondary airflow coming from said air outlet, as well as a nozzle for spraying a primary airflow inside said feed-through duct,
wherein the nozzle is connected to said bleed system.

12 Claims, 6 Drawing Sheets

(52) U.S. Cl.
 CPC .. *F05D 2260/601* (2013.01); *F05D 2270/101* (2013.01); *Y02T 50/60* (2013.01)

(56) References Cited

OTHER PUBLICATIONS

Written Opinion of the International Searching Authority dated Mar. 7, 2016, issued in corresponding International Application No. PCT/FR2015/053200, filed Nov. 24, 2015, 4 pages.
International Search Report dated Mar. 7, 2016, issued in corresponding International Application No. PCT/FR2015/053200, filed Nov. 24, 2015, 5 pages.
Written Opinion of the International Searching Authority dated Mar. 7, 2016, issued in corresponding International Application No. PCT/FR2015/053200, filed Nov. 24, 2015, 5 pages.

\* cited by examiner

COOLING DEVICE FOR A TURBOMACHINE SUPPLIED BY A DISCHARGE CIRCUIT

The invention relates to the field of turbine engines and, in particular, to turboprop engines, but also to high-powered bypass turbojet engines, such as those that are used in civil aviation and that are provided with a unit through which a lubrication oil circulates that must be cooled during certain operating phases. This unit is a reduction gearbox, for example.

In order to enhance their performance, whilst reducing noise and fuel consumption, turbine engines, such as turboprop engines, must have large diameter, low rpm propellers of the "multi-vane" type. However, the power that is transmitted, through a mechanical reduction gearbox, by the gas generator that is rotating at high-speed to the propeller that is rotating at low-speed generates a large amount of heat due to mechanical losses, i.e. to friction. It will be understood that this heat must be effectively discharged or dissipated in order to prevent rapidly degrading the mechanical elements of the reduction gearbox, such as the gears and the bearings, or to prevent degrading the qualities of the reduction gearbox lubricant, at the risk of experiencing a reduction in the performance of the turbine engine. However, even when performance is close to or is slightly more than 99%, the reduction gearbox of a turbine engine with 10,000 kW of mechanical power nevertheless discharges close to 100 kW of thermal power due to mechanical losses. Discharging this type of heat is well known in the field of the prior art, i.e. dissipating such thermal power by circulating the reduction gearbox lubricant in a closed circuit by means of a pump or a thermosiphon, in a radiator, such as an oil radiator, or an air/oil heat exchanger, for example an exchanger known as ACOC (Air Cooled/Oil Cooler).

It is known to propose a turboprop engine that comprises a scoop, in which an exchanger is disposed through which the lubricant circulates, such as that which is known in document EP-0511770-A1.

In such a turboprop engine, moving air passing through the exchanger discharges the heat towards the outside of the scoop and the cooled lubricant returns to the reduction gearbox via the cooling circuit. Optionally, a flap can be located at the inlet or the outlet of the scoop to regulate the airflow passing through the exchanger, so as to regulate the temperature of the lubricant, for example for turboprop engine operating phases for which the radiator is overdesigned relative to the thermal power that it has to discharge.

However, for low aeroplane speeds, and whereby the turboprop engine is operating, the flow of air passing through the exchanger can be insufficient. In order to overcome this disadvantage, it is known for a turboprop engine to be proposed that comprises a cooling device comprising an exchanger, an air outlet of which is connected to an ejector of the jet pump type. Such an ejector comprises a feed-through duct for a secondary airflow coming from the exchanger that comprises at least one nozzle for spraying a primary airflow coming from a compressor of the turboprop engine, intended to accelerate the secondary air flow through a venturi effect. Downstream of the nozzle, a first sector with a reduced section forms a mixer and a second sector with a larger section forms a diffuser.

More specifically, document EP-1018468-A1 and U.S. Pat. No. 8,261,527-B1 propose a turboprop engine of the type previously described, comprising a flap mounted downstream of the ejector duct, which particularly allows the airflow to be regulated.

The spray nozzle is generally fed by a line take-off or bleed duct that is selectively produced on a compressor of the turboprop engine by a valve which allows the airflow that is thus bled to be circulated according to the feed requirements of the nozzle.

Typically, the jet pump is used to compensate for an insufficient secondary airflow through the exchanger, which configuration generally occurs at low airflow speeds through the exchanger, for example when the aeroplane to which the turbine engine is fitted is taxiing at low speed or is stopped pending take-off.

Although most turbine engines conventionally comprise conventional air bleed devices on the compressors that are intended to feed various devices such as, for example, a device for pressurising or air-conditioning the cabin of the associated aircraft, they can further comprise bleed devices that are intended to prevent any pumping phenomena in the compressors of these turbine engines, and particularly in the high-pressure compressors.

Indeed, in a turbine engine, air is directed to a combustion chamber through a plurality of compressor stages. When the air passes through the successive compressor stages, the air pressure increases. In certain conditions, for example when the engine operates at low speeds, a pumping phenomenon can occur.

Pumping is a fundamental cyclical phenomenon that is specific to dynamic compressors. Indeed, compression is obtained in a compressor by exchanging energy in the gas that is moving in rows of vanes. In the same way as an aeroplane wing, which at a high angle of attack and low speed loses its lift and "disengages", a compressor can disengage. At a reduced flow, the compressor no longer allows the airflow to be pushed. As the compressor forms the interface for two different pressure networks, namely a suction network and a blowback network, respectively, in the event of disengagement the capacity of the blowback network, which has the highest pressure, is likely to empty into the capacity of the suction network through a counterflow in the compressor.

When the blowback network has sufficiently emptied into the suction network, the compressor attains new operating conditions that allow it to re-establish the flow in the correct direction, until a new instability cycle recommences.

These considerable cyclical fluctuations in the flow, which are referred to as pumping, correspond to a series of impacts, the mechanical consequences of which can be disastrous, and cause, for example, fractures in the vanes or extremely high radial vibrations, causing the destruction of the internal sealing devices on the centrifugal compressors.

Consequently, current turbine engines comprise devices for bleeding their compressors. A bleed device substantially comprises a large line take-off or bleed duct, produced on the blowback network of the compressor, for example, the high-pressure compressor, which allows, at reduced flows, the pressure to be dropped downstream of the compressor in order to prevent any blowback and consequently to avoid the pumping phenomena. The air bled on the compressor can be discharged into various devices inside or outside the internal flow of a gas stream of the turbine engine.

The bleed device is intended to discharge the pressurised air at high flow rates and, to this end, it comprises line take-offs or bleed ducts that, for bulk and bleed efficiency considerations, are always placed downstream of the compressor that they bleed, these ducts having to bleed, on the one hand, all of the stages of the associated compressor and, on the other hand, having to be large enough to accommodate large flows.

A conventional turbine engine with a bleed device and a cooling device of the type previously described therefore can comprise a conventional line take-off or bleed duct and a line take-off or bleed duct dedicated to a bleed device, both being produced on the same compressor and being intended to feed, on the one hand, the cooling device and, on the other hand, the bleed device, under relatively similar conditions, i.e. when the turbine engine is running at low rpm.

This design has the disadvantage of increasing the number of line take-offs or bleed ducts on the compressor, or else the corresponding valves.

The invention overcomes this disadvantage by proposing a turbine engine equipped with a feed that is at least partially common to these devices.

To this end, the invention proposes a turbine engine comprising a device for bleeding a compressor, particularly a high-pressure compressor, comprising at least one valve for bleeding said compressor, an outlet of said valve being connected to a bleed system designed to discharge a bleed airflow, and at least one device for cooling a unit, comprising a heat exchanger, an air outlet of which is connected to an ejector of the jet pump type, which comprises a feed-through duct for a secondary airflow coming from said air outlet, as well as a nozzle for spraying a primary airflow inside said feed-through duct, for which the spraying is able to be selectively permitted or interrupted by means of an ejector valve, this turbine engine being advantageously characterised in that the nozzle is connected to said bleed system.

According to further features of the invention:
the bleed system of the compressor comprises at least one outlet intended to discharge the bleed airflow inside an internal flow stream of the turbine engine gases;
the bleed system of the compressor comprises at least one outlet intended to discharge the bleed airflow outside an internal flow stream of the turbine engine gases;
the bleed system comprises at least one outlet intended to discharge the bleed airflow outside the turbine engine;
the bleed system of the compressor comprises a single outlet formed by the spray nozzle;
the bleed valve is a two-way valve, an inlet of which is connected to the compressor and an outlet of which is connected to the bleed system and to the nozzle of the cooling device, the spraying of the primary airflow into the nozzle being permitted or interrupted solely by the bleed valve;
the bleed valve is a control valve with at least three ports, one inlet of which is connected to the compressor, one outlet of which is connected to the bleed system and at least one outlet of which is connected to a nozzle associated with a cooling device, the valve progressively regulating the flow between its outlets;
the exchanger is an air/cooling oil exchanger for the lubrication oil of the unit of the turbine engine;
an air inlet of the exchanger of each cooling device is connected to an air intake for its outside air supply, which intake opens onto a surface of a support nacelle of the turbine engine;
the turbine engine comprises at least two cooling devices, for which the air inlets of the exchangers are connected to as many outlets of a feed control valve with at least three ports, the inlet of which is connected to a common air intake, said feed valve progressively regulating the airflow between its at least two outlets.

The invention further relates to a method for controlling a device for cooling at least one unit of a turbine engine, comprising a heat exchanger, an air outlet of which is connected to an ejector of the jet pump type, which comprises a feed-through duct for a secondary airflow coming from said air outlet, as well as a nozzle for spraying a primary airflow inside said feed-through duct.

This method is characterised in that it comprises at least one step of feeding the spray nozzle, during which the spray nozzle is fed with a bleed airflow originating from a bleed system of a compressor of the turbine engine, and at least one step of cutting off the feed to the spray nozzle.

According to a further feature of the method, the feed step corresponds to low-powered operation of the turbine engine, particularly idling speed operation, during which a bleed valve, an outlet of which is connected to the bleed system, is open, and the step of cutting off the feed to the spray nozzle corresponds to nominal or maximum-powered operation, during which the bleed valve is closed.

The invention will be better understood and further details, features and advantages of the present invention will become more clearly apparent upon reading the following description, which is provided by way of a non-limiting example, and with reference to the accompanying drawings, in which.

Throughout the following description, identical reference numerals denote identical parts or parts with similar functions.

Figure 1:
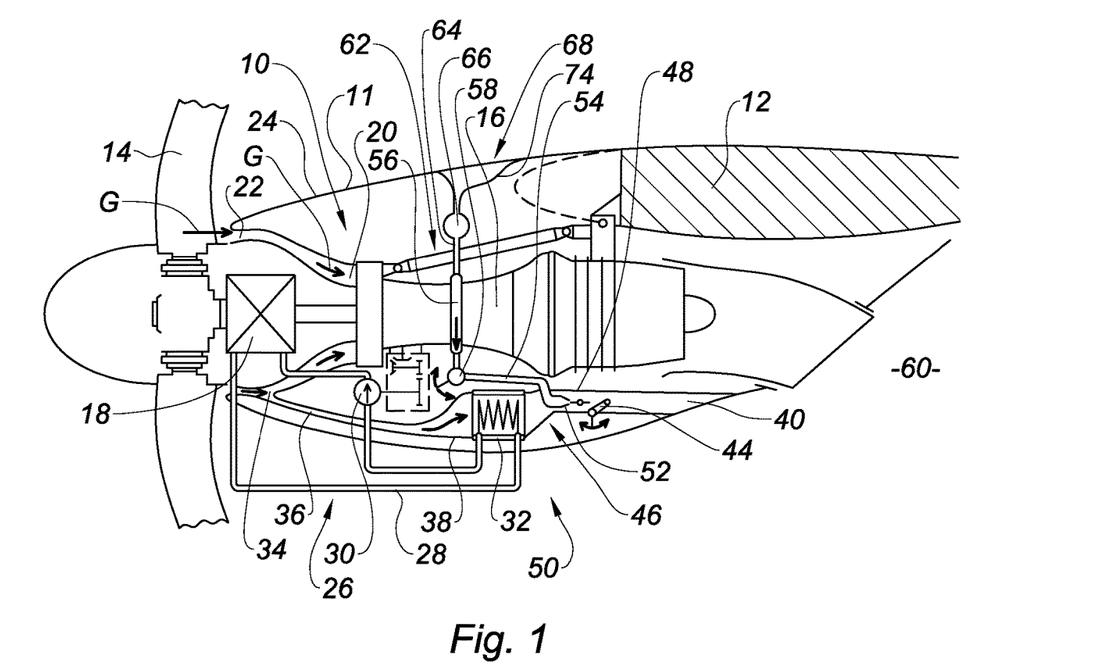
FIG. 1 is a section view of a turboprop engine according to the prior art.

FIG. 1 shows the main elements of a turbine engine 10 installed in a nacelle 11 under the wing 12 of an aeroplane.

In this case, the turbine engine 10 is a turboprop engine, but this configuration by no means limits the invention.

A propeller 14 is located in the upstream section of said turboprop engine, which propeller is rotated by a turbine 16 through a reduction gearbox 18.

The turbine 16 receives the combustion gases from a combustion chamber that is fed with air via an internal air circuit 20, the intake of which is provided by an inlet duct 22, which is placed immediately downstream of the propeller 14 at the tip of an upstream cowl 24 of the nacelle 11 of the turboprop engine 10. The flow of the gases passing through the turboprop engine 10 is shown by the arrows "G".

The reduction gearbox 18 is fed with lubricant by a lubrication circuit 26, which substantially comprises ducts 28, a pump 30 and a heat exchanger 32 intended to allow the lubricant circulating through the reduction gearbox 18 to be cooled.

The exchanger 32 forms part of a cooling device 50, which extends over the entire longitudinal direction of the turboprop engine. The cooling air of the exchanger 32 is bled downstream of the inlet duct 22. To this end, an air intake slot 34 is used that is placed on the internal air circuit 20 of the turbine engine, downstream of the inlet duct 22, in order to feed an air feed duct 36, which feeds the exchanger 32 with cool air, which exchanger is housed in a central part 38 of the cooling device 50 that is widened in order to accommodate the exchanger 32.

The cooling device 50 is supplemented by a discharge duct 40 placed downstream of the central part 38 in order to extend the circulation of air in the exchanger 32 and to discharge the air into the ambient environment 60. The flow through the cooling device 50 also can be regulated by a flap 44 placed in the discharge duct 40.

In such a turboprop engine 10, the operation of the cooling device is associated with the operating conditions of the turboprop engine 10.

Therefore, in high-speed flight in cruising mode, during a long-haul flight, for example, or in cold weather, the air entering the air intake slot 34, routed by the feed duct 36 through the exchanger 32 and discharged by the discharge duct 40, generally sufficiently cools the exchanger 32 and the lubricant passing through the exchanger. In certain conditions, the airflow in the cooling device 50 optionally may need to be modulated by means of the flap 44 to prevent excessive cooling of the lubricant, which would adversely affect the operation of the reduction gearbox 18. The flap 44 advantageously can be controlled by the device for automatically controlling the operation of the turboprop engine 10, which is preferably of the "FADEC" (Full Authority Digital Engine Control) type and which is activated by a known electrical, electromechanical, hydraulic or electrohydraulic means such as a cylinder (not shown).

However, at low speed, or in conditions in which the airflow naturally reaching the air feed duct 36 is insufficient, for example when held in a parking area, when circulating on the ground at idling speed or when taxiing in intense heat, it is worthwhile accelerating the air circulation flow in the cooling device 50.

To this end, the cooling circuit 50 comprises, downstream of the exchanger 32 and upstream of the discharge duct 40, an ejector 46 of the jet pump type.

As shown in FIG. 1, such an ejector 46 substantially comprises a feed-through duct 48 for a secondary airflow coming from the radiator 32 and at least one nozzle 52 for spraying a primary airflow inside said duct 48, intended to accelerate the airflow through a venturi effect.

As shown in FIG. 1, the nozzle 52 is fed with primary air by a bleed duct 54 connected to the compressor 56 of the turboprop engine 10 and air circulation within this bleed duct 54 can be permitted or interrupted by an ejector valve 58.

Injecting primary air allows the secondary airflow to be accelerated through a venturi effect and, consequently, when this is required, allows the flow passing through the exchanger 32 to be increased, which results in improved cooling.

Figure 2:
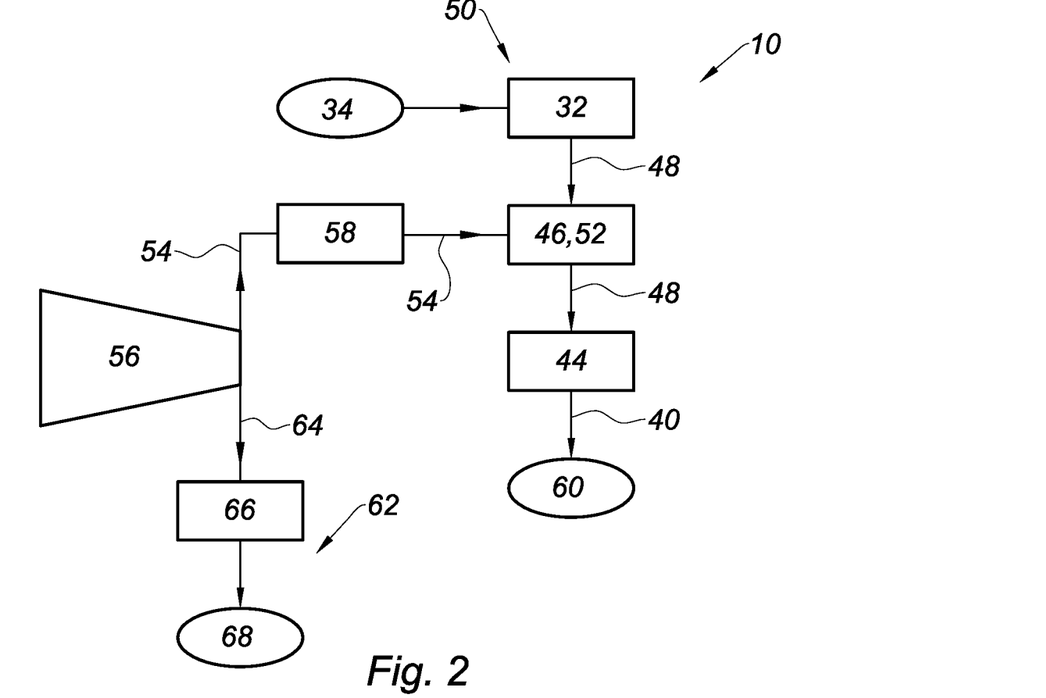
FIG. 2 is a schematic view of a turbine engine according to the prior art.

The schematic configuration of such a cooling device 50 has also been partly and schematically shown in FIG. 2 in a more general manner, said cooling device 50 being able to be applied to any turbine engine comprising an exchanger 32 dedicated to cooling a unit, and not specifically to a turbine engine comprising an exchanger 32 dedicated to cooling a reduction gearbox 18.

With reference to FIG. 1, the turboprop engine 10 further conventionally comprises a bleed device 62 intended to avoid the pumping phenomena within the compressor 56.

The device 62 successively comprises a line take-off 64 or bleed duct connected to the compressor 56 and a bleed valve 66 of said compressor, an outlet of which is connected to a bleed system 68 designed to discharge a bleed airflow. The bleed valve 66 is better known as HBV (Handling Bleed Valve).

FIG. 1 shows a bleed system 68 formed by a scoop 74, which allows the air bled from the compressor 56 to be discharged directly into the ambient environment, but it will be understood that the bleed system 68 can assume other configurations, as will be seen hereafter with reference to various variants of the invention.

In this configuration, FIG. 1 clearly shows, as does FIG. 2, that a turbine engine, such as the turboprop engine 10, equipped with a cooling device 50 and a bleed device 62 comprises two bleed ducts 54 and 64 and two valves, namely an ejector valve 58 and a bleed valve 66.

However, the opening of these valves 58, 66 is controlled under the same turbine engine operating conditions, i.e. for low turbine engine rpm and at low speed, on the one hand, within the context of the bleed device 62 to avoid the pumping phenomena within the compressor 56 and, on the other hand, within the context of the cooling device to increase the flow in the exchanger 32.

The redundancy of at least the bleed ducts 54 and 64 penalises the on-board mass of the turbine engine 10 and increases the complexity.

The invention overcomes this disadvantage by proposing a turbine engine 10 of the type previously described, characterised in that, as is schematically shown in FIGS. 3, 7, 9 and 10, the nozzle 52 of the cooling device 50 is connected to the bleed system 68 of the bleed device 52.

More generally, the invention proposes a turbine engine 10 comprising at least one cooling device 50 that comprises at least one spray nozzle 52 associated with this cooling device 50, which nozzle is connected to the bleed system 68 of the turbine engine 10.

It will be understood, as will be seen throughout the remainder of this description, that the turbine engine 10 can comprise a plurality of cooling devices 50 and a plurality of corresponding nozzles 52, as will be described for the turboprop engine 10 of FIGS. 7 to 10, in particular.

This configuration advantageously allows the nozzle 52 of the cooling device 50 to be fed using the bleed system 68 without using a specific bleed duct of the same type as the bleed duct 54 that has been described with reference to FIG. 2, and thus without requiring an additional line take-off on the housing of the compressor 56. This configuration therefore allows the number of ducts used in the turbine engine 10 to be reduced.

Figure 3:
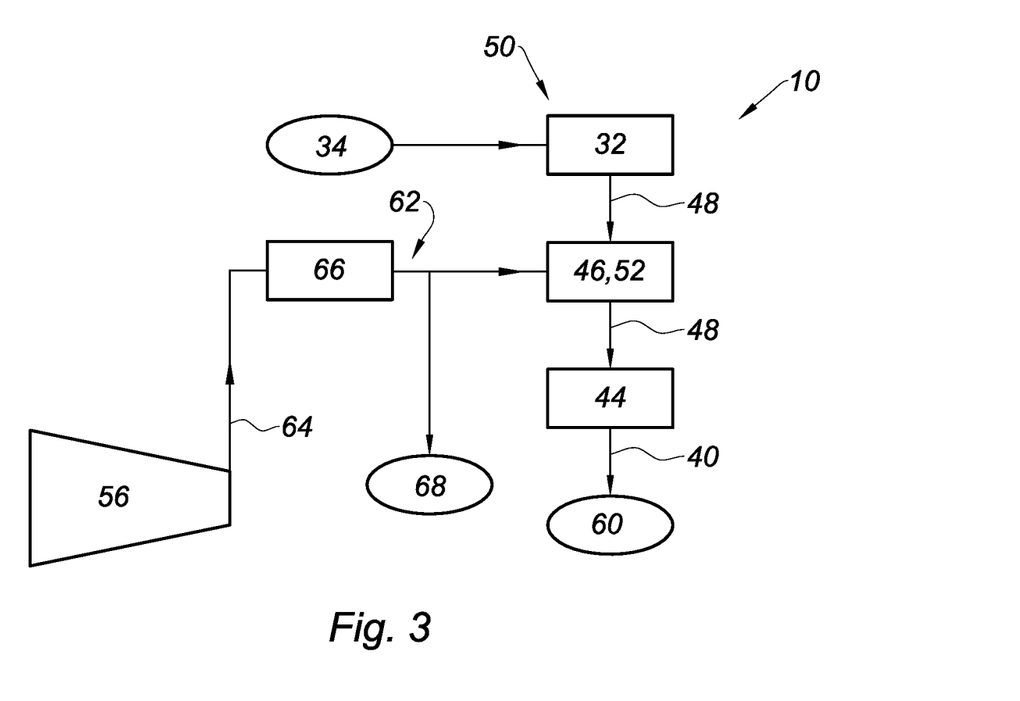
FIG. 3 is a schematic view of a first embodiment of a turbine engine produced according to the invention.

According to a first embodiment of the invention that has been shown in FIG. 3, the bleed valve is a two-way valve 66, an inlet of which is connected to the compressor 56 and an outlet of which is connected to the bleed system 68. The nozzle 52 of the cooling device 50 is connected to the bleed system 68 downstream of the outlet of the bleed valve 66. For this reason, spraying the primary airflow into the nozzle 52 is permitted or interrupted solely by the bleed valve 66. The bleed valve 66 consequently acts as an ejector valve.

Indeed, since the opening of the bleed valve 66 is controlled exactly according to the turbine engine operating conditions that are also required to feed the cooling device 50, said cooling device 50 thus can be fed directly by the bleed valve 66 via the bleed system 68. This configuration thus allows the number of valves used in the turbine engine 10 to be reduced, i.e. for low turbine engine rpm and at low speed.

As previously mentioned, the bleed system 68 can assume various configurations and the nozzle 52 can be connected to this bleed system 68 regardless of the configuration.

Figure 4:
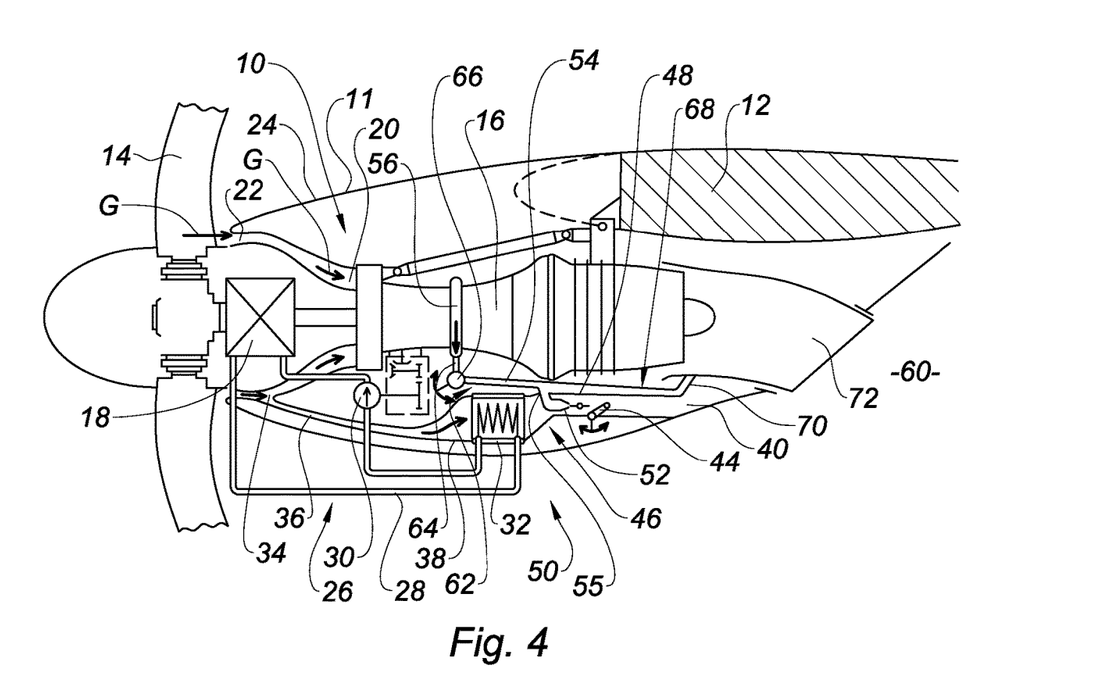
FIG. 4 is a section view of a first variant of a turboprop engine according to the first embodiment of the invention.

For example, as shown in FIG. 4, which represents a first variant of the first embodiment of the invention, the bleed system 68 can comprise at least one outlet 70 intended to discharge the bleed airflow inside the internal flow of the turboprop engine 10 gases, for example in a pipe 72. The cooling device 50 comprises a branch 55 connected to the bleed system 68 in order to feed the nozzle 52.

The compressor bleed system 68 can further comprise at least one outlet intended to discharge the bleed air outside the internal flow of the turboprop engine 10 gases. Again, the cooling device 50 comprises a branch 55 connected to the bleed system 68 in order to feed the nozzle 52.

Figure 5:
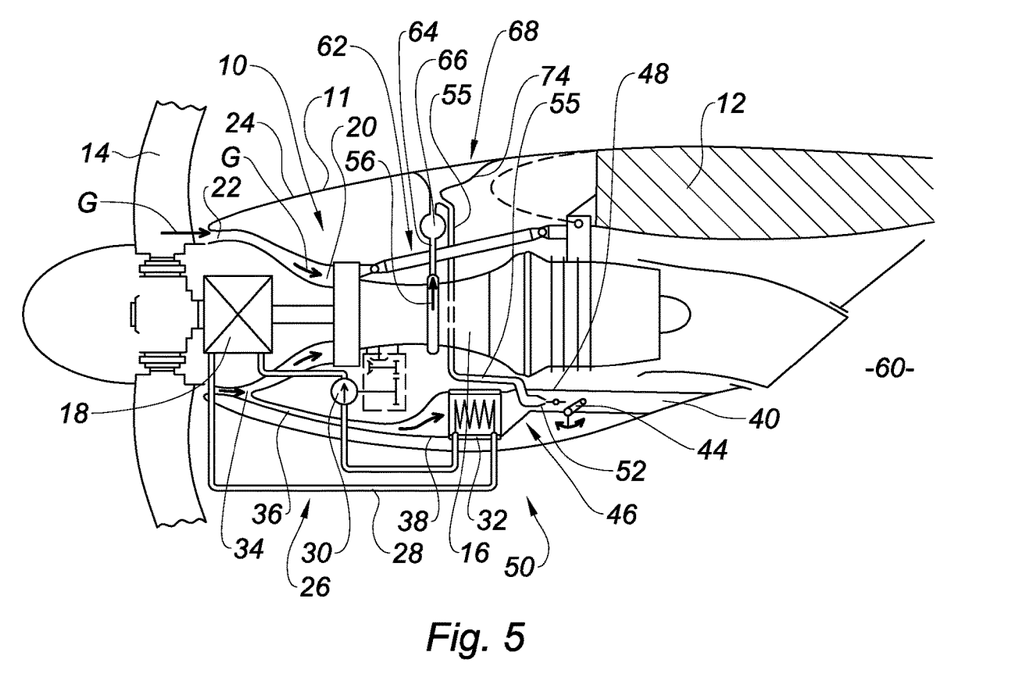
FIG. 5 is a section view of a second variant of the turboprop engine according to the first embodiment of the invention.

For example, as shown in FIG. 5, which represents a second variant of the first embodiment of the invention, the bleed system 68 can comprise an outlet intended to discharge the bleed airflow directly outside the turboprop engine 10, i.e. into the ambient environment 60, by means of a scoop 74 similar to that which has been previously shown in FIG. 1 with reference to the prior art. In this case, the cooling device 50 further comprises a branch 55 connected to the bleed system 68 to allow the nozzle 52 to be fed and this branch is located in the scoop 74, for example.

Figure 6:
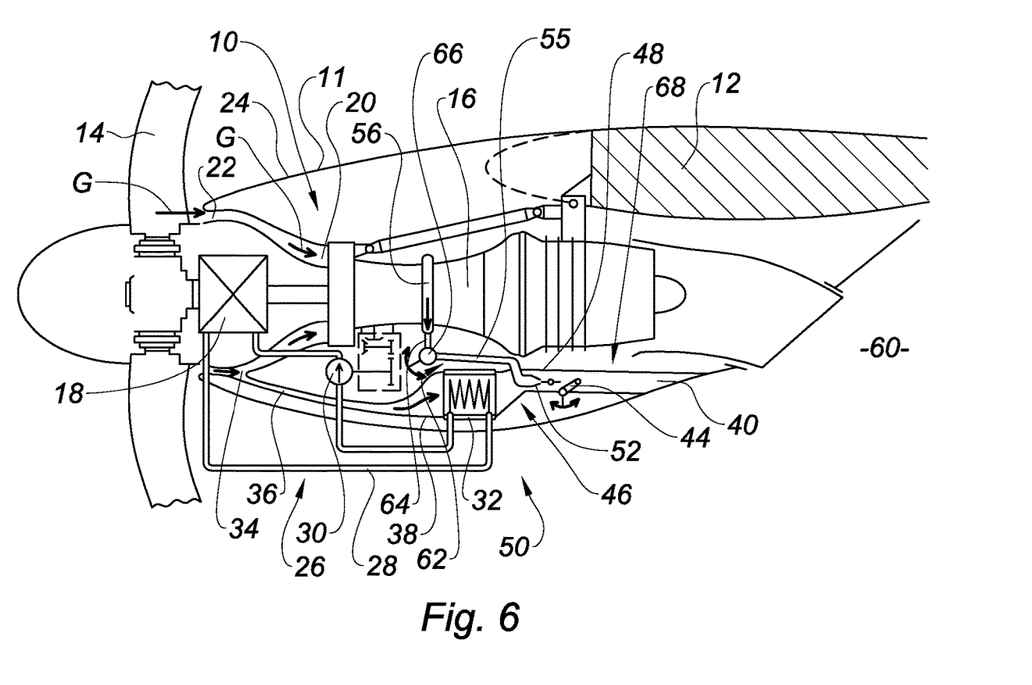
FIG. 6 is a section view of a third variant of the turboprop engine according to the first embodiment of the invention.

Finally, according to a third variant of the first embodiment of the invention, which has been shown in FIG. 6, the compressor bleed system could comprise a single outlet formed by the spray nozzle 52. In this case, the aforementioned bleed system 68 is purely and simply replaced by the spray nozzle 52 and the branch duct 55 extends the line take-off 64. This solution considerably simplifies the bleed system 68 but nevertheless requires comprehensive computation of the dimensions of the nozzle 52 and of the flow through the bleed valve 66, so that the flow is not too high and does not risk causing excessive cooling of the exchanger 32.

According to the second to fourth embodiments of the invention, the bleed valve is a control valve 67 with at least three ports, one inlet 69 of which is connected to the compressor 56, one outlet 71 of which is connected to the bleed system 68 and at least one outlet 73 of which is connected to at least one nozzle 52 associated with a corresponding cooling device 50, with the valve 67 progressively regulating the flow between its outlets.

Figure 7:
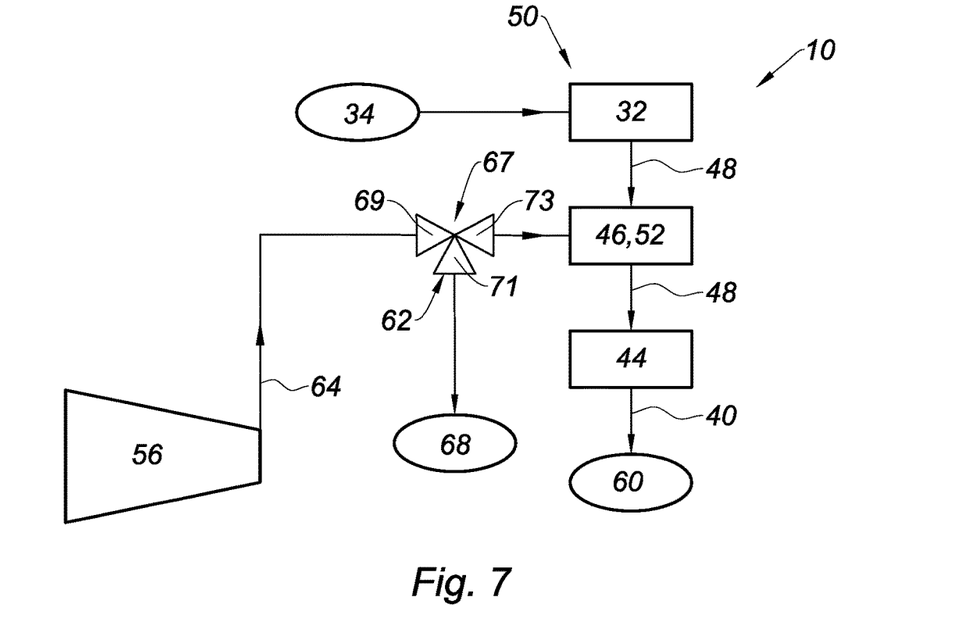
FIG. 7 is a schematic view of a second embodiment of a turbine engine produced according to the invention.
Figure 8:
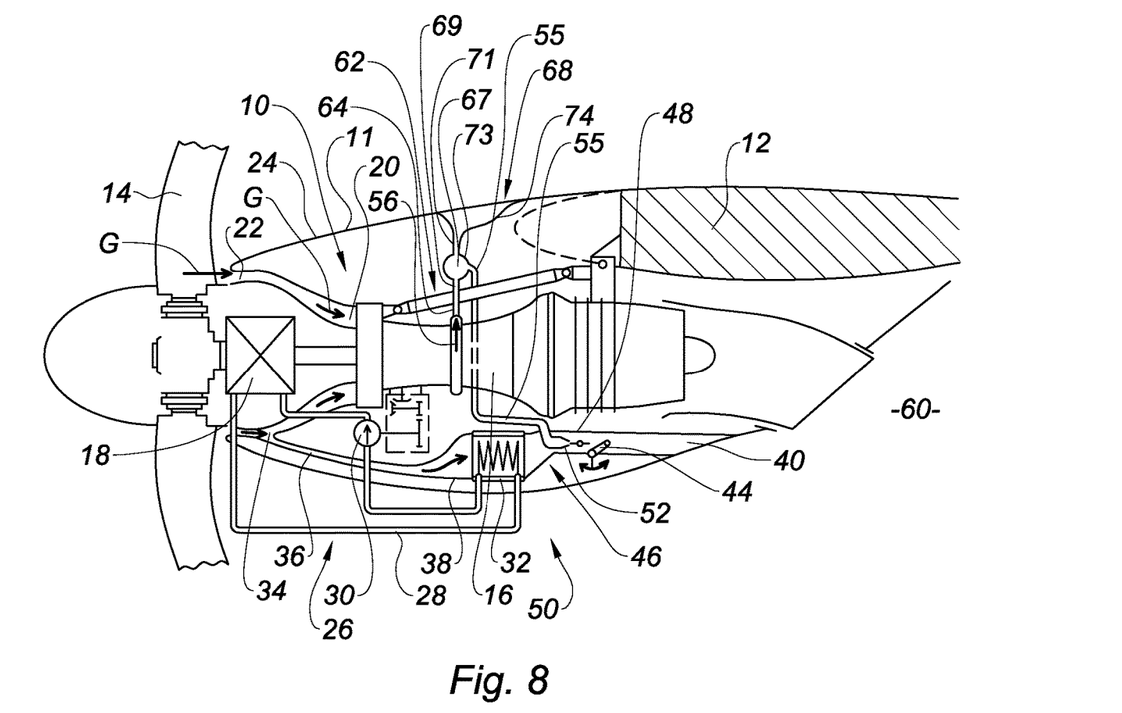
FIG. 8 is a section view of a turboprop engine according to the second embodiment of the invention.

As shown in FIG. 7, according to a second embodiment of the invention, the turbine engine 10 only comprises one cooling device 50 and the valve 67 is a three-way valve, which is able to regulate the bleed airflow on the compressor 56, which reaches it via its inlet 69, in order to distribute it between its outlet 71 connected to the bleed device 68 and its outlet 73 connected to the nozzle 52 of the ejector 46 of the cooling device 50. The valve 67 can comprise a slide valve, for example, allowing progressive regulation of the airflow between its outlets 71 and 73 by varying a through section that is determined by the position of a slide.

Such a valve 67 is widely known in the prior art and will not be described in further detail throughout the remainder of the present description.

This configuration allows, due to the progressiveness of the regulation of the flow between the outlets 71, 73 of the valve 67, the air flow that is sent to the nozzle 52 to be regulated as a function of the flight phases and the performance of the exchanger 32 to be adapted to the oil temperature, which itself depends on the engine environment, for example, an environment corresponding to the aeroplane manoeuvring on the ground, flying at low altitude or flying at high altitude.

Figure 9:
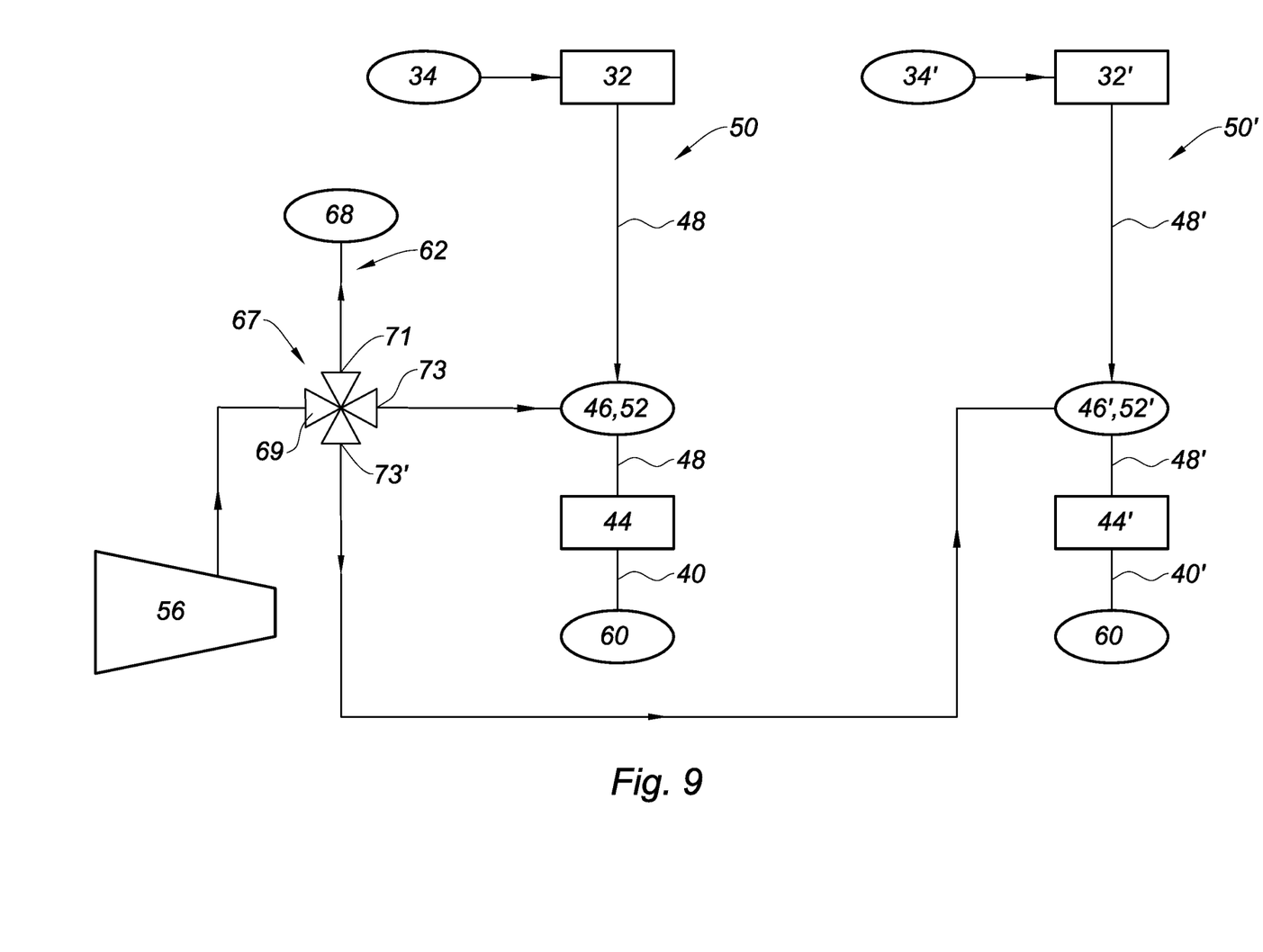
FIG. 9 is a schematic view of a third embodiment of a turbine engine produced according to the invention.

As shown in FIG. 9, according to a third embodiment of the invention, the turbine engine 10 comprises two cooling devices 50, 50' and the bleed valve 67 is a four-way control valve, one inlet 69 of which is connected to the compressor 56, one outlet 71 of which is connected to the bleed system 68 and two outlets 73, 73' of which are connected to nozzles 52, 52' each associated with one of the independent cooling devices 50, 50'. Each device 50, 50' comprises a heat exchanger 32, 32' fed by an air intake 34, 34' and an air outlet, which is connected to an ejector 46, 46' of the jet pump type comprising a feed-through duct 48, 48' for a secondary airflow coming from this air outlet, the spray nozzle 52, 52' being accommodated inside said feed-through duct 48.

In this configuration, the valve 67 is able to regulate the bleed airflow on the compressor 56, which reaches it via its inlet 69, in order to distribute it between its outlet 71 connected to the bleed device 68 and its outlets 73, 73' connected to the nozzles 52, 52' of the ejectors 46, 46' of the cooling devices 50, 50'. Like the previous embodiment, the bleed valve 67 can comprise a slide valve, for example, allowing progressive regulation of the air flow between its outlets 71, 73 and 73'.

This configuration is particularly adapted to a turbine engine 10, for which, in response to the installation and spatial requirement restrictions of the cooling devices 50, 50', it is preferable to use a plurality of small exchangers 32, 32' as opposed to a single large exchanger. Each exchanger 32, 32', independently fed with air, also can be connected to an independent coolant circuit that independently cools the unit 18.

It will be understood that the invention is not limited to embodiments including three-way and four-way bleed valves, but can comprise a valve comprising more ports and, consequently, more outlets each associated with a cooling device.

Figure 10:
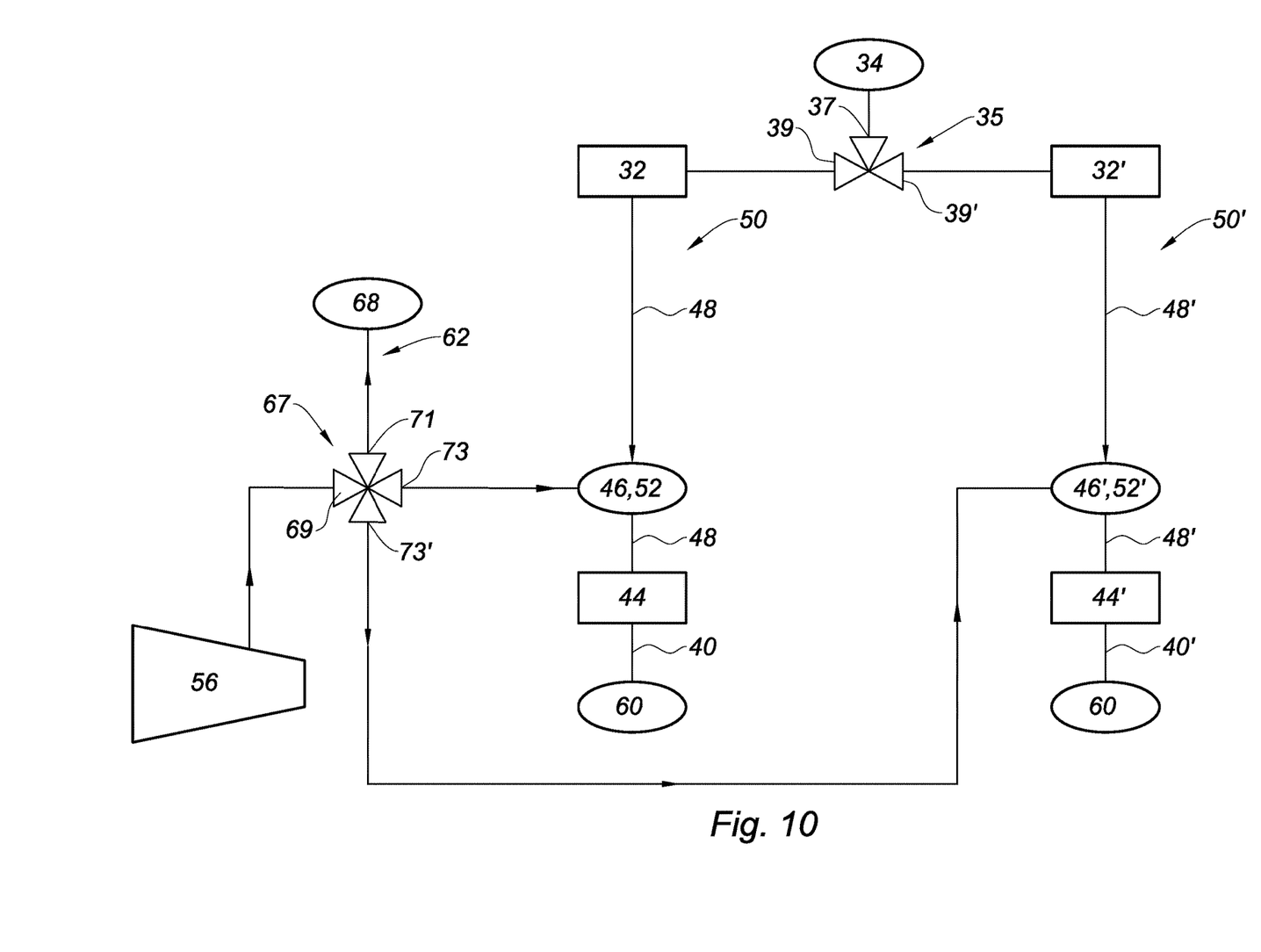
FIG. 10 is a schematic view of a fourth embodiment of a turbine engine produced according to the invention.

FIG. 10 shows a fourth embodiment of the invention, in which the bleed valve 67 is also a four-way control valve, one inlet 69 of which is connected to the compressor 56, one outlet 71 of which is connected to the bleed system 68 and two outlets 73, 73' of which are connected to nozzles 52, 52' that are each associated with an independent cooling device 50, 50'.

However, in this third embodiment, the devices 50, 50' each comprise respective heat exchangers 32, 32' that are fed by a common air intake 34. This configuration is particularly adapted to a turbine engine 10 that is accommodated in a nacelle 11, for which the available space does not allow more than one air intake 34 to be installed. Advantageously, in this embodiment, the exchangers 32, 32' are connected to two outlets 39, 39' of a feed valve 35 in keeping with the shape of a three-way control valve, the inlet 37 of which is connected to a common air intake 34, the feed valve 35 progressively regulating the airflow between its at least two outlets 39.

It will be understood that in the case of a turbine engine comprising a greater number of cooling devices, a common air intake 34 can be provided that is connected to a multi-way valve comprising as many outlets as the turbine engine comprises cooling devices.

It also will be understood that, in the third and fourth embodiments of the invention, the selection of the number of cooling devices 50, 50' will be directly dictated by the space available in the nacelle 11 and by the cost of installing such devices.

In general, in the preferred embodiment of the invention, the exchanger 32 is an air/cooling oil exchanger for the lubrication oil of a unit of the turbine engine 10.

For example, in the case of a turboprop engine 10 of the type shown in FIGS. 4 to 6, the unit is a reduction gearbox similar to the reduction gearbox 18 of FIG. 1.

Excessive cooling of the oil circulating in the exchanger 32 can adversely affect the performance of this reduction gearbox 18. Therefore, it is important that the use of the one or more cooling devices is controlled.

Therefore, the invention proposes a method for controlling at least one cooling device 50 of at least one unit 18 of a turbine engine, comprising a heat exchanger 32, an air outlet of which is connected to an ejector 46 of the jet pump type, which comprises a feed-through duct 48 for a secondary airflow coming from said air outlet as well as a nozzle 52 for spraying a primary airflow inside said feed-through duct 48, which method comprises at least one step of feeding the spray nozzle 52, during which the spray nozzle 52 is fed with a bleed airflow originating from the bleed system 68 of a turbine engine compressor. This feed step corresponds to low-powered operation of the turbine engine 10, particularly to idling speed operation, during which the bleed valve 66, 67, an outlet of which is connected to the bleed system 68, is open. According to the embodiments of the turbine engine 10, and particularly in the case of the use of a bleed valve 67 with a plurality of ports, the spray nozzle 52 is fed with a bleed airflow that is regulated by the valve 67.

It will be understood that, as the use of the jet pump is no longer required to improve the cooling of the exchanger 18, the method defines a step of cutting-off the feed to the spray nozzle 52. This step of cutting-off the feed to the spray nozzle 52 corresponds to nominal or maximum-powered operation, during which the bleed valve 66, 67 is closed.

Therefore, the invention allows the same compressed air feed to be shared by the bleed system 68 and the cooling device 50, and also allows the control of this feed to be shared through the use of a common bleed valve 66 or 67, which usefully allows the mass of the turbine engine 10 to be reduced.

The invention also allows an air intake 34 to be shared between a plurality of cooling devices 50, 50'.

The air intakes 34 or 34' that are used in the turbine engine according to the invention are preferably air intake slots similar to that shown in FIGS. 4, 5, 6 and 8. However, the use of air intakes of the type with a flush scoop of the Flush or NACA type, or even the use of a dynamic scoop, can be contemplated without changing the nature of the invention, the selection of the type of air intake being determined by a correlation of the airflow that it is able to provide and the sizing of the elements of the one or more corresponding cooling devices.

Therefore, the invention allows the cooling circuit of a turbine engine unit to be simplified in a simple and effective manner.

The invention claimed is:

1. A turbine engine, comprising:
a device for bleeding a compressor, particularly a high-pressure compressor, said device being configured to avoid any pumping phenomena within the compressor and comprising at least a bleed duct placed downstream of said compressor and bleeding said compressor, the bleed duct being connected to said compressor by at least one valve and connected to a bleed system designed to discharge a bleed airflow at reduced flows, so as to allow a pressure to be dropped downstream of the compressor in order to prevent any blowback and to avoid any pumping phenomena in said compressor; and
at least one device for cooling at least one unit, comprising a heat exchanger, an air outlet of which is connected to an ejector of the jet pump type, which comprises a feed-through duct for a secondary airflow coming from said air outlet and a nozzle configured to spray a primary airflow inside said feed-through duct,
wherein the nozzle is connected to said bleed system.

2. A turbine engine according to claim 1, wherein the bleed system of the compressor comprises at least one outlet intended to discharge the bleed airflow inside an internal flow stream of the turbine engine gases.

3. A turbine engine according to claim 1, the bleed system of the compressor comprises at least one outlet configured to discharge the bleed airflow outside an internal flow stream of the turbine engine gases.

4. A turbine engine according to claim 3, wherein the bleed system comprises at least one outlet configured to discharge the bleed airflow outside the turbine engine.

5. A turbine engine according to claim 1, wherein the bleed system of the compressor comprises a single outlet formed by the spray nozzle.

6. A turbine engine according claim 1, wherein the bleed valve is a two-way valve, an inlet of which is connected to the compressor and an outlet of which is connected to the bleed system and to the nozzle of the cooling device, the spraying of the primary airflow into the nozzle being permitted or interrupted solely by the bleed valve.

7. A turbine engine according to claim 1, wherein the bleed valve is a control valve with at least three ports, one inlet of which is connected to the compressor, one outlet of which is connected to the bleed system and at least one outlet of which is connected to a nozzle associated with a cooling device, the valve progressively regulating the flow between its outlets.

8. A turbine engine according to claim 1, wherein the exchanger is an air/cooling oil exchanger for the lubrication oil of the unit of the turbine engine.

9. A turbine engine according to claim 1, wherein an air inlet of the exchanger of each cooling device is connected to an air intake for its outside air supply, which intake opens onto the surface of a support nacelle of the turbine engine.

10. A turbine engine according to claim 1, further comprising at least two cooling devices, for which the air inlets of the exchangers are connected to as many outlets of a feed control valve, the inlet of which is connected to a common air intake, said feed valve progressively regulating the airflow between its at least two outlets.

11. A method for controlling at least one device for cooling at least one unit of a turbine engine, comprising a heat exchanger, an air outlet of which is connected to an ejector of the jet pump type, which comprises a feed-through duct for a secondary airflow coming from said air outlet, as well as a nozzle for spraying a primary airflow inside said feed-through duct, the method comprising the steps of:
feeding the spray nozzle, during which the spray nozzle is fed with a bleed airflow originating from a bleed system of a compressor of the turbine engine, said bleed system being designed to discharge a bleed airflow at reduced flows, so as to allow a pressure to be dropped downstream of the compressor in order to prevent any blowback and to avoid any pumping phenomena in said compressor, and said bleed system being connected to a bleed duct placed downstream the compressor it bleeds, and connected to said compressor by at least one valve; and cutting off the feed to the spray nozzle.

12. A control method according to claim 11, wherein the feed step corresponds to low-powered operation of the turbine engine, particularly idling speed operation, during which a bleed valve, an outlet of which is connected to the bleed system, is open, and in that the step of cutting off the feed to the spray nozzle corresponds to nominal or maximum-powered operation, during which the bleed valve is closed.

* * * * *

UNITED STATES PATENT AND TRADEMARK OFFICE
CERTIFICATE OF CORRECTION

PATENT NO. : 10,883,422 B2
APPLICATION NO. : 15/528474
DATED : January 5, 2021
INVENTOR(S) : B. Boujida et al.

Page 1 of 1

It is certified that error appears in the above-identified patent and that said Letters Patent is hereby corrected as shown below:

| Column | Line | Claim | |
|---|---|---|---|
| 11 | 1 | 11 | Please change "downstream the" to -- downstream of the --. |

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*